United States Patent
Sheehan et al.

(10) Patent No.: US 7,253,750 B2
(45) Date of Patent: Aug. 7, 2007

(54) BIDIRECTIONAL WIRELESS NUMBER PAD AND KEYBOARD

(75) Inventors: Peter Sheehan, New Castle (IE); Denis Pavillard, Monnaz (CH); Patrick Monney, Mex (CH); Alexis Richard, Cully (CH); Alain Tabasso, Essertines (CH)

(73) Assignee: Logitech Europe S.A., Romanel-sur-Morges (CH)

( * ) Notice: Subject to any disclaimer, the term of this patent is extended or adjusted under 35 U.S.C. 154(b) by 439 days.

(21) Appl. No.: 10/613,512

(22) Filed: Jul. 3, 2003

(65) Prior Publication Data

US 2004/0246150 A1    Dec. 9, 2004

Related U.S. Application Data

(63) Continuation-in-part of application No. 29/183,332, filed on Jun. 9, 2003, now Pat. No. Des. 491,182, and a continuation-in-part of application No. 29/183,333, filed on Jun. 9, 2003, now Pat. No. Des. 491,945.

(51) Int. Cl.
    *G08C 17/00*    (2006.01)
(52) U.S. Cl. .................................... 341/22; 341/176
(58) Field of Classification Search ............ 341/22, 341/176, 173, 20; 345/168, 173; 455/226.1, 455/557; 400/472
    See application file for complete search history.

(56) References Cited

U.S. PATENT DOCUMENTS

| | | | |
|---|---|---|---|
| 5,181,029 A | 1/1993 | Kim | |
| 5,412,377 A | 5/1995 | Evans et al. | |
| 5,600,313 A | 2/1997 | Freedman | |
| 5,935,225 A | 8/1999 | Peng et al. | |
| 5,986,586 A | 11/1999 | Tsai | |
| 6,031,470 A * | 2/2000 | Asari et al. | 341/22 |
| 6,085,232 A | 7/2000 | Kikinis | |
| 6,088,516 A | 7/2000 | Kreisel et al. | |
| 6,114,977 A | 9/2000 | Smith et al. | |
| 6,144,363 A | 11/2000 | Alloul et al. | |
| 6,317,061 B1 * | 11/2001 | Batra et al. | 341/22 |
| 6,396,483 B1 | 5/2002 | Hiller | |
| 6,714,143 B2 * | 3/2004 | Ideura | 341/23 |
| 6,902,332 B2 * | 6/2005 | McLoone | 400/472 |
| 2002/0082042 A1 | 6/2002 | Mark et al. | |
| 2002/0190955 A1 | 12/2002 | Chen | |
| 2005/0088333 A1 * | 4/2005 | Allport | 341/176 |

OTHER PUBLICATIONS

"Bluetooth Wireless Technology," product information from www.microsoft.com, Microsoft Corporation. Redmond, WA USA (2004).
"Logitech Cordless Comfort Duo," product information from www.logitech.com, Logitech, Inc. Fremont, CA USA (2004).

* cited by examiner

*Primary Examiner*—Brian Zimmerman
*Assistant Examiner*—Hung Q Dang
(74) *Attorney, Agent, or Firm*—Townsend and Townsend and Crew, LLP

(57) ABSTRACT

The present invention uniquely separates the number pad from a keyboard providing a separate, wireless device. This separate wireless device with the number pad includes a display and has multiple modes of operation.

2 Claims, 4 Drawing Sheets

BIDIRECTIONAL WIRELESS NUMBER PAD AND KEYBOARD

CROSS-REFERENCES TO RELATED APPLICATIONS

This application is a continuation-in-part of design patent application Ser. No. 29/183,333, filed Jun. 9, 2003, entitled, "Wireless Number Pad", and design patent application Ser. No. 29/183,332, filed Jun. 9, 2003, entitled, "Wireless Keyboard." This application is related to co-pending application Ser. No. 60/484,629, filed even date herewith, entitled "Wireless Input Devices for Computer System", the disclosure of which is hereby incorporated by reference.

BACKGROUND OF THE INVENTION

The present invention relates to wireless computer input devices, and in particular to keyboards using Bluetooth™ wireless technology.

Microsoft has recently released a combination wireless keyboard and mouse using Bluetooth™ technology, which communicates with a wireless hub. The hub connects to the computer via a cable to the USB port of the computer.

Logitech, the assignee of the present application, makes a cordless keyboard and mouse using 27 mHz radio transmissions to a wireless hub connected to a USB receiver, connected to the computer.

A number of keyboards incorporate a small LCD display, such as U.S. Pat. No. 5,181,029. A keyboard with a flat panel display is shown in U.S. Pat. No. 6,396,483.

A number of patents disclose providing indicators on a keyboard for notification of an e-mail message, such as U.S. Pat. Nos. 6,085,232 and 6,088,516.

U.S. Pat. No. 6,114,977 discloses a calculator integrated with a keyboard with a send key for sending the data on the calculator to an application on the computer.

Separately from keyboard, numerous remote control devices exist which have a display and keys. For example, U.S. Pat. No. 5,412,377 illustrates a hand-held remote with an LCD display.

BRIEF SUMMARY OF THE INVENTION

The present invention uniquely separates the number pad from a keyboard providing a separate, wireless device. This separate wireless device with the number pad includes a display and has multiple modes of operation.

In a first mode of operation, the device acts as a classic number pad. In a second mode of operation, the device acts as a calculator. The calculated result can be automatically uploaded to the clipboard of application software on a computer through a wireless hub. In a third mode, the device provides a navigating function, allowing navigation through options in application software either on a PC display or on a small display on the device, which has been described as a MediaPad™ device.

In one embodiment, the MediaPad™ device includes a media button for launching a media application for playing music or displaying video or pictures. This media button is duplicated on the keyboard.

For a further understanding of the nature and advantages of the invention, reference should be made to the following description taken in conjunction with the accompanying drawings.

DETAILED DESCRIPTION OF THE INVENTION

Figure 1:
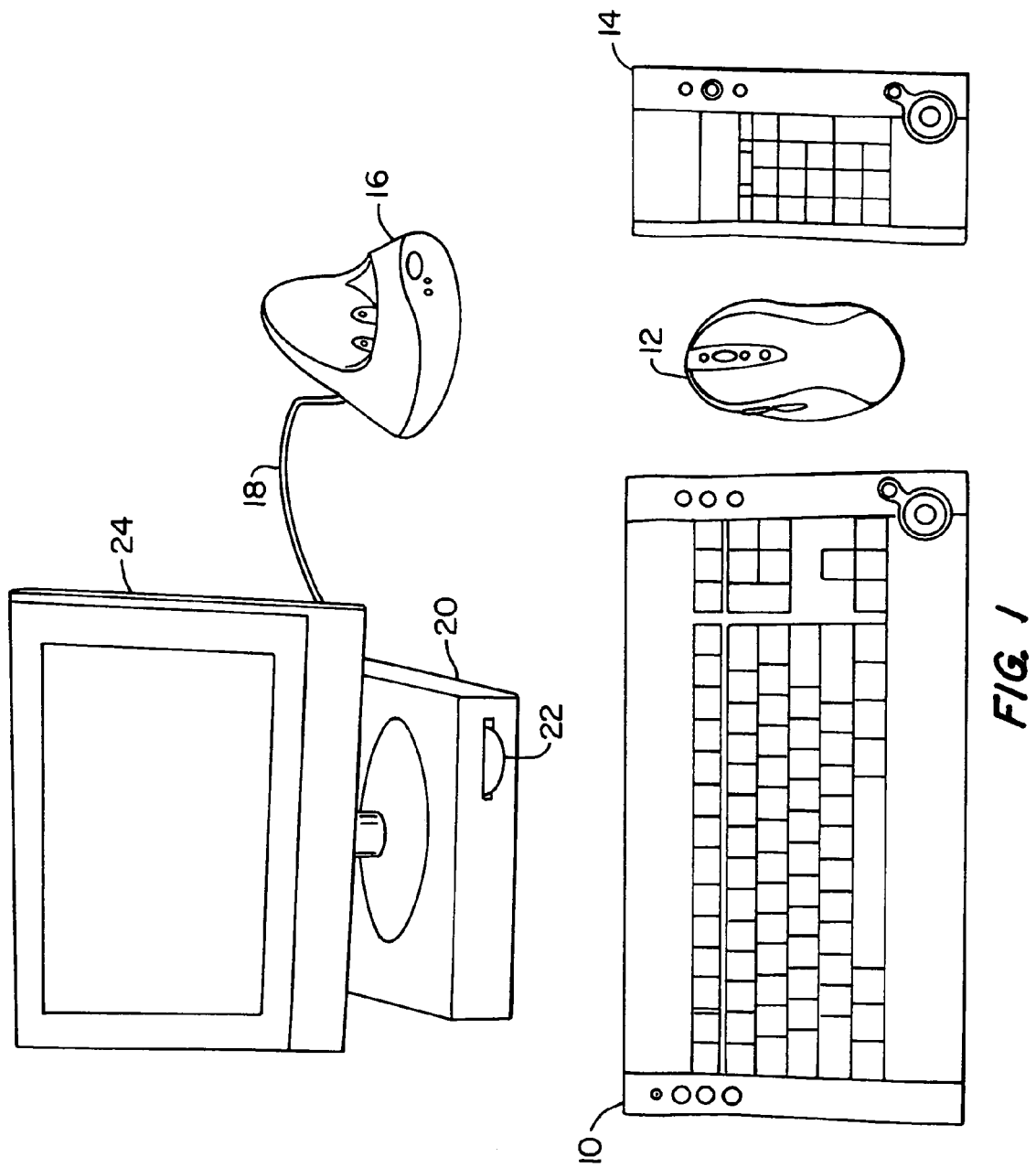
FIG. 1 is a diagram illustrating the components of a system according to the present invention.

FIG. 1 illustrates a wireless keyboard 10, wireless mouse 12 and wireless MediaPad™ device 14. All three of these communicate with a wireless hub 16, which is connected via a USB cable 18 to the USB port of a computer 20. The computer can be loaded with software from a compact disk 22, and includes a display 24.

Keyboard 10, mouse 12 and MediaPad™ device 14 all communicate using Bluetooth™ technology with hub 16. Hub 16 also acts as a battery charger for charging the batteries of mouse 12, which is preferably an optical mouse.

Figure 2:
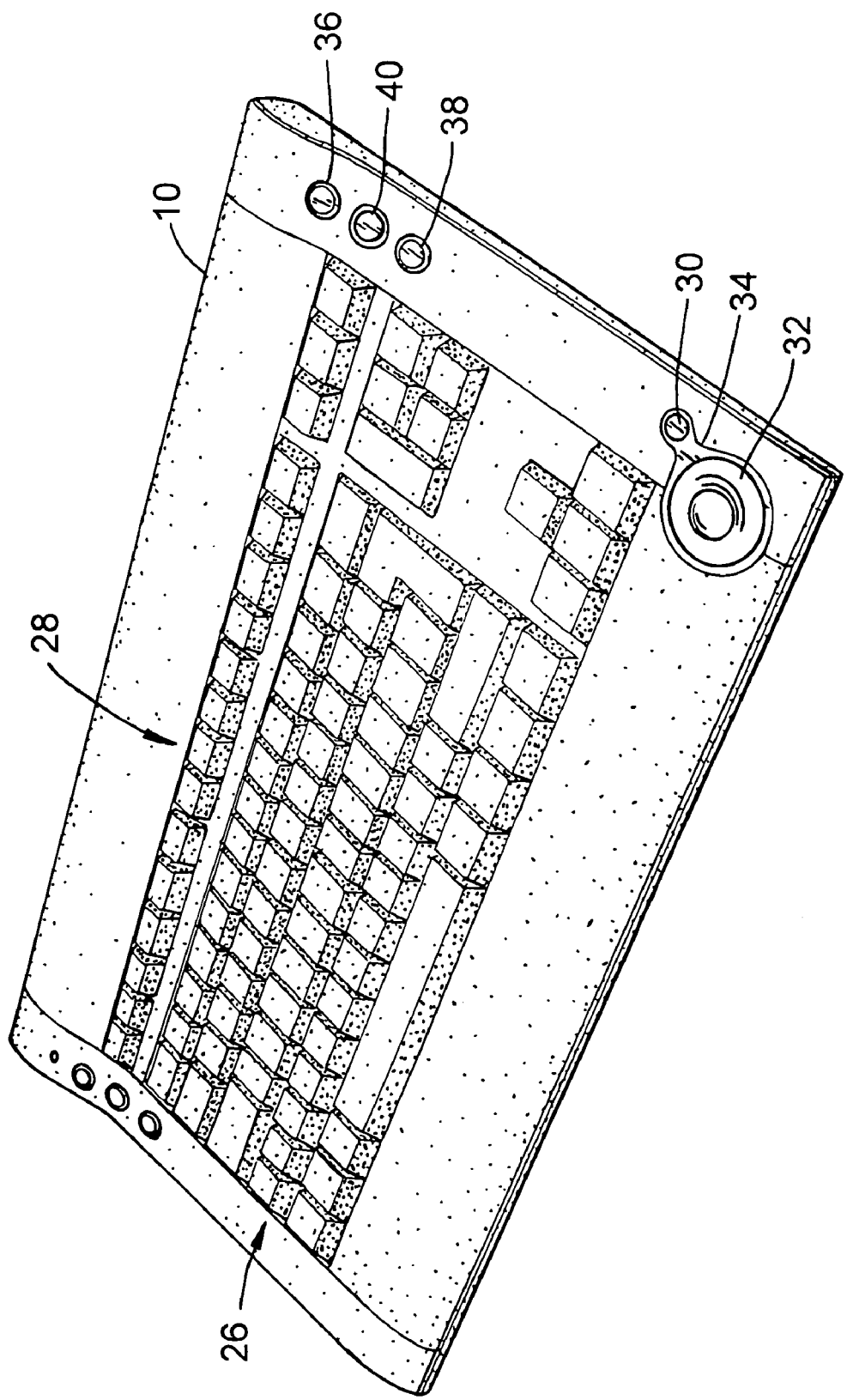
FIG. 2 is a perspective view of the keyboard of FIG. 1.

FIG. 2 illustrates keyboard 10 in more detail. The keyboard includes a standard alpha-numeric key array 26, and function keys 28. In addition, it includes a media button 30 for launching a media application which can play music, videos, and display pictures. Media button 30 is visually linked to a four-way button 32 for selecting among media options, such as stop, forward, reverse and play/pause. Buttons 30 and 32 are visually linked by a plate 34. The keyboard also includes a volume up button 36, volume down button 38 and mute button 40.

Figure 3:
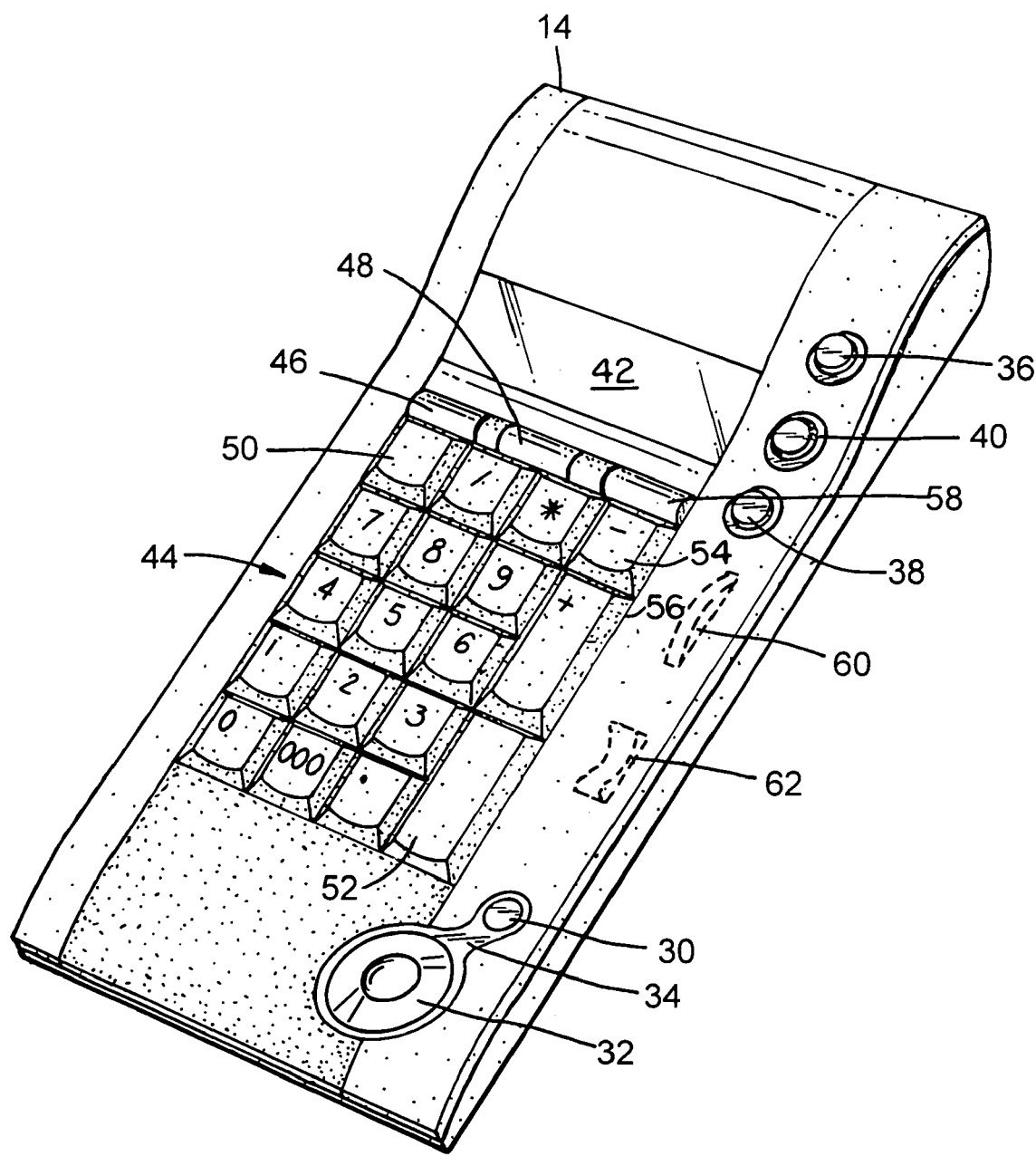
FIG. 3 is a perspective view of the MediaPad™ device of FIG. 1.

MediaPad™ device 14 is illustrated in more detail in FIG. 3. The MediaPad™ device includes a liquid crystal display (LCD) 42. A number pad 44 is included, and a number pad button 46 selects the number pad function for the number pad buttons. A navigate button 48 selects the alternate functions for these number pads. In one embodiment, button 1 is "open", button 3 is "closed", button 7 is "back", button 9 is "forward", button 5 is a Windows Start launching button, and buttons 4, 8, 6, and 2 are directional arrows for left, up, right, and down, respectively.

Also included is a clear button 50, an enter button 52, a subtraction button 54, an addition button 56, and backslash (/) and asterisk (*) buttons as indicated. A calculate button 58 activates a calculator application.

The MediaPad™ device also includes buttons which duplicate buttons on the keyboard. These are the volume up button 36, mute button 40, and volume down button 38, as well as media button 30, four-way button 32 and plate 34.

In one embodiment, the MediaPad™ device also includes a scrolling wheel 60 which allows scrolling up or down in any application. In addition, a rocker switch 62 or a wheel could be used to allow zooming in and out of any type of document.

The number pad and calculator can be used with the computer display, or with the small display on the MediaPad™ device itself. The LCD can also display a variety of other information, which is either a subset of what is on the computer display or separate from what is on the computer display. For example:

(1) Music related information, such as the artist's name, song title or track number.

(2) Video-related information, such as the track name and length of video.

(3) Digital pictures related information, such as the name of the picture, and preview of the next image while running a slide show on the monitor.

(4) E-mail notification, a notification one has received a new e-mail in the mailbox.

(5) Instant messaging—the buddy list, instant messages, text messages relayed from a cell phone, etc.

(6) News notifications, such as news headlines, sports scores, and stock prices. The MediaPad™ device can then be used to get more detailed information from the PC monitor. The navigation button allows selection of what should be displayed on the LCD.

By putting the number pad on the MediaPad™ device of the present invention, the keyboard can be made smaller, and more flexibility is provided for the arrangement of the keyboard, mouse and MediaPad™ device on a desktop. For example, the mouse can be placed closer to the keyboard, with the MediaPad™ device being placed on the outside where a mouse would normally be. This allows the user to easily reach the mouse from the keyboard. The low profile and zero degree slope surface of the keyboard and Media-Pad™ device shifts the wrist of the user to a more neutral posture. Alternately, the MediaPad™ device can be placed on the left for left-handed users.

Figure 4:
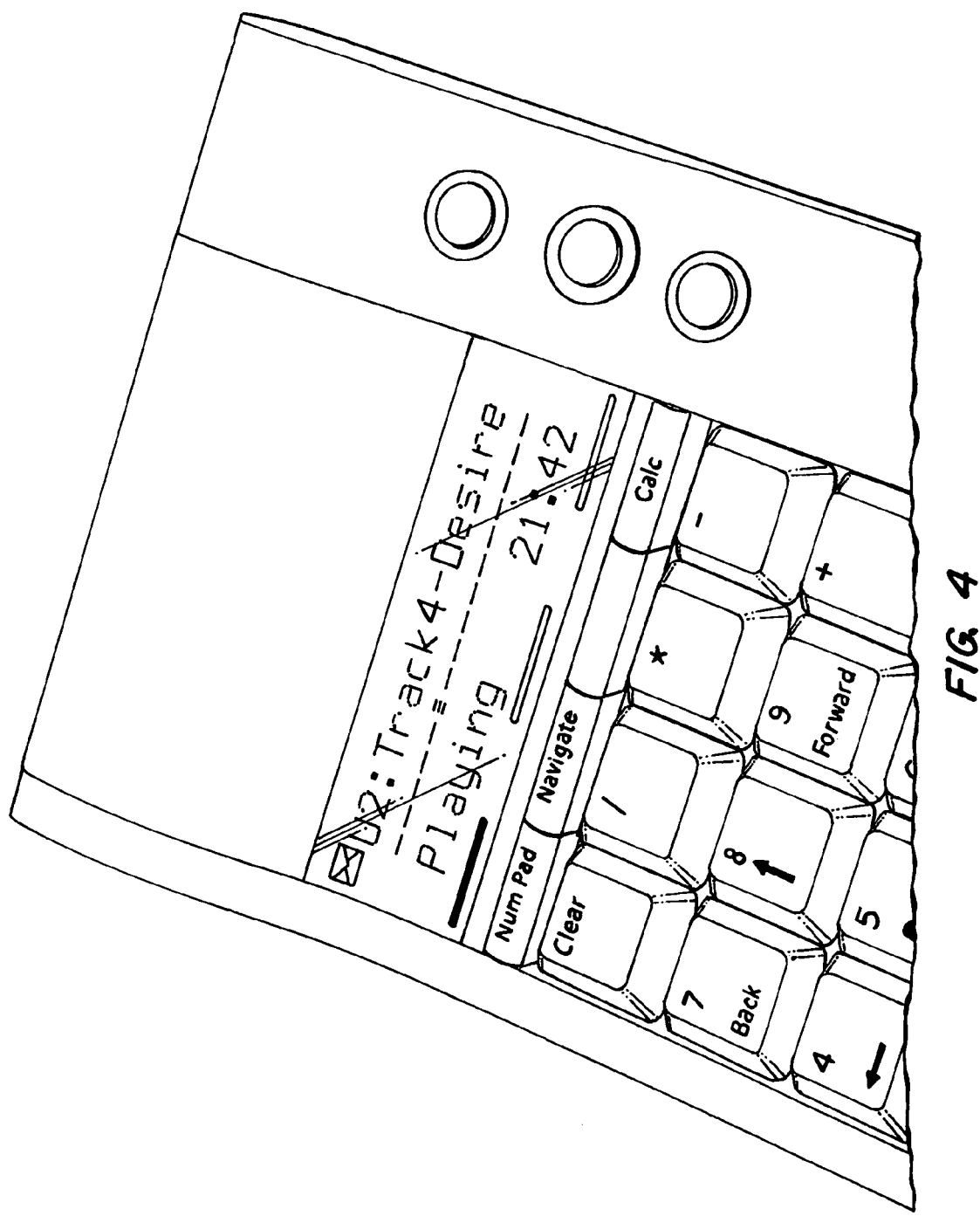
FIG. 4 shows a portion of the MediaPad™ device of FIG. 3, illustrating the LCD display.

FIG. 4 illustrates the display of the MediaPad™ device in more detail, showing the example of a song being played, with the top line showing the artist (the group U2), the track number, and the title of the track. The second line shows the status (playing) and the current elapsed time.

Hub 16 of FIG. 1 allows other devices to be connected as well via the Bluetooth™ technology. For example, a connection to a printer can be established, so that print jobs can be initiated from the keyboard, mouse or MediaPad™ device by instructions to application software on the computer, which will then send the print job over the USB cable 18 to the hub 16, which includes a transmitter for sending, using Bluetooth™, the print job to a Bluetooth™-equipped printer.

A mobile phone or PDA can also be in communication with Bluetooth™ hub 16. Both can synchronize with the software on the computer through the Bluetooth™ hub. Data, photos, etc. can be shared between the mobile phone, PDA, PC and MediaPad™ device. The shared photos or other data could be sent by e-mail or other applications. SMS or text messages received by a cell phone can also be shared via the Bluetooth™ hub when the cell phone is within Bluetooth™ distance of the hub. For example, an SMS text message can be sent from the cell phone, through hub 16 to MediaPad™ device 14 for display on the MediaPad™ device's display. A dialog box can be created on the computer display, and the user, once notified, can go to a keyboard 10 to reply to the text message. This allows a user to use the desktop keyboard, instead of the phone, to do a text message reply.

In another embodiment, a Bluetooth™ headset is used to communicate with hub 16. This can be used for listening to music, or for using a headset and microphone after launching instant message or chat, with the communication over the Bluetooth™ link to hub 16, and from there over the IM application running on the computer 20.

The present invention with its MediaPad™ device thus allows the personal computer to be used as a real media center, controllable from anywhere within Bluetooth™ range. The MediaPad™ device can be used either with the computer display in a desk usage mode, or using its own LCD display in a mobile usage mode. Information can be exchanged in both directions between the computer and the MediaPad™ device. The LCD display allows the user to have visibility and understanding of the computer application status. The two displays can be used together, with the user using control information on the MediaPad™ device display, for example, but actually viewing a video or photo on the computer display.

As will be understood by those of skill in the art, the present invention could be embodied in other specific forms without departing from the essence of the invention. For example, the display could be LEDs instead of an LCD, a wireless technology other than Bluetooth™ could be used, and the hub could be integrated into a laptop or other computer. Accordingly, the foregoing description is intended to be illustrative, but not limiting, of the scope of the invention which is set forth in the following claims.

What is claimed is:

1. A computer interface system comprising:
   a hub connected to said computer and configured to communicate wirelessly with at least three peripheral devices;
   a wireless mouse for wirelessly communicating with said hub;
   a wireless keyboard for wirelessly communicating with said hub, said wireless keyboard having an alphanumeric keyboard but no separate number pad; and
   a wireless, mobile media device and numeric keyboard for wirelessly communicating with said hub, said wireless mobile media device and numeric keyboard including
   a number pad,
   a display, said mobile media device and numeric keyboard being configured to provide to said display for a music application, at least one of an artist's name, song title and track number, and for a video application, at least one of a track number, a length of a video, a video title and an elapsed time, and
   a back button,
   a forward button,
   a volume up button,
   a volume down button,
   a stop button, and
   a pause button;
   wherein said wireless keyboard and wireless mobile media device and numeric keyboard each include media buttons for performing the same functions.

2. A computer interface system comprising:
   a hub connected to said computer and configured to communicate wirelessly with at least three peripheral devices;
   a wireless mouse for wirelessly communicating with said hub;
   a wireless keyboard for wirelessly communicating with said hub, said wireless keyboard having an alphanumeric keyboard but no separate number pad;
   a wireless mobile media device and numeric keyboard for wirelessly communicating with said hub, said wireless mobile media device and numeric keyboard including a number pad and a display;
   wherein said wireless keyboard and wireless mobile media device and numeric keyboard each include media buttons for performing the same functions; and
   wherein said media buttons include a volume up button, a volume down button and a mute button.

* * * * *